(12) United States Patent  
Nguyen et al.

(10) Patent No.: US 12,056,941 B2  
(45) Date of Patent: *Aug. 6, 2024

(54) COMPUTER VISION SYSTEMS AND METHODS FOR INFORMATION EXTRACTION FROM TEXT IMAGES USING EVIDENCE GROUNDING TECHNIQUES

(71) Applicant: Insurance Services Office, Inc., Jersey City, NJ (US)

(72) Inventors: Khoi Nguyen, Corvallis, OR (US); Maneesh Kumar Singh, Princeton, NJ (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,998

(22) Filed: Jan. 24, 2023

(65) Prior Publication Data

US 2023/0386229 A1    Nov. 30, 2023

Related U.S. Application Data

(63) Continuation of application No. 17/132,114, filed on Dec. 23, 2020, now Pat. No. 11,562,591.

(Continued)

(51) Int. Cl.  
*G06V 20/62*    (2022.01)  
*G06F 18/20*    (2023.01)  
(Continued)

(52) U.S. Cl.  
CPC ........ *G06V 20/62* (2022.01); *G06F 18/24147* (2023.01); *G06F 18/295* (2023.01);  
(Continued)

(58) Field of Classification Search  
CPC ............. G06V 20/62; G06V 30/18057; G06V 30/19173; G06V 30/413; G06V 30/414;  
(Continued)

(56) References Cited

U.S. PATENT DOCUMENTS 5,892,843 A * 4/1999 Zhou .................. G06V 30/40  
                                                            382/176  
10,262,235 B1 * 4/2019 Chen .................. G06N 3/044  
(Continued)

OTHER PUBLICATIONS

Zhou et al, "EAST: An Efficient and Accurate Scene Text Detector" (published in 2017 IEEE Conference on Computer Vision and Pattern Recognition (CVPR), pp. 2642-2651, Jul. 2017).*

(Continued)

*Primary Examiner* — Casey L Kretzer  
(74) *Attorney, Agent, or Firm* — McCarter & English, LLP

(57) ABSTRACT

Computer vision systems and methods for text classification are provided. The system detects a plurality of text regions in an image and generates a bounding box for each detected text region. The system utilizes a neural network to recognize text present within each bounding box and classifies the recognized text, based on at least one extracted feature of each bounding box and the recognized text present within each bounding box, according to a plurality of predefined tags. The system can associate a key with a value and return a key-value pair for each predefined tag.

14 Claims, 10 Drawing Sheets

Related U.S. Application Data

(60) Provisional application No. 62/952,749, filed on Dec. 23, 2019.

(51) Int. Cl.
  *G06F 18/2413* (2023.01)
  *G06V 30/10* (2022.01)
  *G06V 30/18* (2022.01)
  *G06V 30/19* (2022.01)
  *G06V 30/413* (2022.01)
  *G06V 30/414* (2022.01)

(52) U.S. Cl.
  CPC .. *G06V 30/18057* (2022.01); *G06V 30/19173* (2022.01); *G06V 30/413* (2022.01); *G06V 30/414* (2022.01); *G06V 30/10* (2022.01)

(58) Field of Classification Search
  CPC .. G06V 30/10; G06F 18/24147; G06F 18/295
  See application file for complete search history.

(56) References Cited

U.S. PATENT DOCUMENTS

| | | | |
|---|---|---|---|
| 11,562,591 B2 * | 1/2023 | Nguyen | G06V 30/19173 |
| 2021/0192201 A1 | 6/2021 | Nguyen et al. | |
| 2021/0201018 A1 * | 7/2021 | Patel | G06Q 30/0201 |

OTHER PUBLICATIONS

Zhang et al, "Multiresolution Graph Attention Networks for Relevance Matching" (published in CIKM '18: Proceedings of the 27th ACM International Conference on Information and Knowledge Management, pp. 933-942, Oct. 2018).*

Zheng, et al., "Conditional Random Fields as Recurrent Neural Networks," IEEE International Conference on Computer Vision, Dec. 2015 (9 pages).

Office Action dated Jan. 28, 2022, issued in connection with U.S. Appl. No. 17/132,114 (13 pages).

Notice of Allowance dated Aug. 9, 2022, issued in connection with U.S. Appl. No. 17/132,114 (12 pages).

Gilmer, et al., "Neural Message Passing for Quantum Chemistry," arXiv:1704.01212v2, Jun. 12, 2017 (14 pages).

Hamilton, et al., "Inductive Representation Learning on Large Graphs," 31st Conference on Neural Information Processing Systems (2017) (11 pages).

He, et al., "Deep Residual Learning for Image Recognition," in Proceedings of the IEEE Conference on Computer Vision and Pattern Recognition (2016) (9 pages).

Karatzas, et al., "ICDAR 2013 Robust Reading Competition," 2013 12th International Conference on Document Analysis and Recognition (10 pages).

Karatzas, et al., "ICDAR 2015 Competition on Robust Reading," 2015 13th International Conference on Document Analysis and Recognition (ICDAR) (5 pages).

Kipf, et al., "Semi-Supervised Classification with Graph Convolutional Networks," arXiv:1609.02907v4, Feb. 22, 2017 (14 pages).

Lafferty, et al., "Conditional Random Fields: Probabilistic Models for Segmenting and Labeling Sequence Data," Proceedings of the 18th International Conference on Machine Learning 2001 (ICML 2001) (10 pages).

Shi, et al., "An End-to-End Trainable Neural Network for Image-Based Sequence Recognition and Its Application to Scene Text Recognition," arXiv:1507.05717v1, Jul. 21, 2015 (9 pages).

Velickovic, et al., "Graph Attention Networks," arXiv:1710.10903v3, Feb. 4, 2018 (12 pages).

Wang, et al., "Non-Local Neural Networks," The IEEE Conference on Computer Vision and Pattern Recognition (CVPR), 2018 (10 pages).

Zhang, et al., "Self-Attention Generative Adversarial Networks," arXiv:1805.08318v2, Jun. 14, 2019 (10 pages).

Notice of Allowance dated Nov. 2, 2022, issued in connection with U.S. Appl. No. 17/132,114 (6 pages).

* cited by examiner

FIG. 6

|  | Description | Inputs | Outputs | Metrics |
|---|---|---|---|---|
| Task 1 | Tag Labeling | Image, Gt-boxes, Gt-texts | Label for Each Box | Classification Score, Count Number of Correct Classifications |
| Task 2 | Text Recognition + Tag Labeling | Image, Gt-boxes | Label for Each Box, And Its Recognized Text | Classification Score + Use Minimum Edit Distance (med) ≤ K as Correct Recognized Text |
| Task 3 | Text Detection + Text Recognition + Tag Labeling | Image | Detected Boxes With Tags and Text Contents | Triplet (precision, Recall, F1) |
| Task 4 | Information Retrieval | Image, Tags | Key-value Pair for Each Tag | Number of Correct Retrieved Key-value Pairs, Use Med for Text Recognition |

FIG. 7

| KNN | CRF | CRF-RNN | GAT | MLP |
|---|---|---|---|---|
| K=1 | 47.55 | 69.35 | 72.31 | |
| K=3 | 50.29 | 69.92 | 84.21 | 25.03 |
| K=5 | 54.43 | 68.44 | 96.21 | |
| K=7 | 57.1 | 65.59 | 86.25 | |

FIG. 8A

| | Precision | Recall | F1 |
|---|---|---|---|
| Bounding Boxes | 78.58 | 41.55 | 49.77 |
| Bounding Boxes and Texts | 76.26 | 40.33 | 48.31 |
| Bounding Boxes, Texts and Tags | 42.87 | 26.9 | 28.61 |

FIG. 8B

| | a Social Security Number | Official Use Only | | |
|---|---|---|---|---|
| 25726 | 6112668 | | | |
| b Eid Number | | 1 Wages | | 2 Federal Taxes |
| 6559501 | | 64488 | | 3938 |
| c Employer's address | | 3 Social Security wages | | 3 Social Security Taxes |
| John Washington | | 21933 | | 31686 |
| USCGC Gain | | 5 MC wages | | 6 Medicare Taxes |
| FPO AE 90957 1343 | | 60918 | | 87676 |
| d Employee Number | | 7 Social Security tips | | 8 Allocated tips |
| 1978487 | | 35943 | | 49593 |
| | | 9 | | 10 D Care |
| | | 3679 | | 54602 |
| e Name of Employee | | 11 Nonqualified plans | | 12a Box 12a |
| Kristen Jones | | 90118 | | 48245 |
| 5507 Wood Burg Apt. 690 | | 13 Box 13 | | 12b Box 12b |
| Brookston | | 35320 | | 51324 |
| MO 20803 | | | | |
| 15 state | 16 St wages | 17 State taxes | 18 Local wages | 19 Local taxes | 20 locality |
| State ID | | | | | |
| CA | 13410 | 66201 | 23206 | 20644 | 36828 | ABC |
| form of W2 | | 1995 | | department of treasury |

FIG. 9

COMPUTER VISION SYSTEMS AND METHODS FOR INFORMATION EXTRACTION FROM TEXT IMAGES USING EVIDENCE GROUNDING TECHNIQUES

RELATED APPLICATIONS

This application is a continuation of U.S. patent application Ser. No. 17/132,114 filed on Dec. 23, 2020 (now issued U.S. Pat. No. 11,562,591), which claims priority to U.S. Provisional Patent Application Ser. No. 62/952,749 filed on Dec. 23, 2019, the entire disclosures of which are hereby expressly incorporated by reference.

BACKGROUND

Technical Field

The present disclosure relates generally to the field of computer vision technology. More specifically, the present disclosure relates to computer vision systems and methods for information extraction from text images using evidence grounding techniques.

Related Art

Convolutional neural network ("CNNs") are widely used in machine learning and are an effective tool in various image processing tasks, such as classification of objects and text analysis. In particular, CNNs can be used as feature extractors to extract different details from images to identify objects and words in the images. As a feature extractor, CNNs are stable with respect to small variations in the input data, and therefore, perform well in a variety of classification, detection and segmentation problems.

Evidence grounding is a process whereby given a text image, information related to predefined tags is retrieved from the image. For example, applying the evidence grounding process to federal tax (W2) forms, the content of the forms (e.g., names, social security numbers, etc.) can be retrieved. However, while such forms contain fixed content, their format is varied from one form to another, which causes information retrieval issues. Currently, in the computer vision field, evidence grounding is a challenging problem because computer visions systems have difficulty locating complete text regions that contain solid information. Also, computer visions systems have difficulty classifying which text contents belong to which predefined tags. Even further, computer visions systems have difficulty associating detected texts to form a key-value pair.

Therefore, there is a need for computer vision systems and methods which can address the problem of evidence grounding in computer visions systems, thereby improving the ability of computer vision systems to retrieve the contents which are related to predefined tags. These and other needs are addressed by the computer vision systems and methods of the present disclosure.

SUMMARY

The present disclosure relates to computer vision systems and methods for information extraction from text images using evidence grounding techniques. Specifically, the system includes a modified Conditional Random Fields machine learning system implemented as a Recurrent Neural Network and a modified Graph Attention Network. The system first detects text regions in the image which contains solid information. The system then recognizes text inside the detected text regions. Next, the system classifies the recognized text according to one or more predefined tags. Finally, the system associates key with value and returns a key-value pair of each predefined tag.

BRIEF DESCRIPTION OF THE DRAWINGS

The foregoing features of the invention will be apparent from the following Detailed Description of the Invention, taken in connection with the accompanying drawings, in which:

FIG. 6 is an illustration showing detection of text regions by the system of the present disclosure, as well as extraction of text from the regions;

FIG. 7 is a table showing four tasks capable of being performed by the system of the present disclosure;

FIGS. 8A-8B are tables showing accuracy of results produced by the system of the present disclosure;

FIG. 9 is an illustration showing an example output by the system of the present disclosure.

DETAILED DESCRIPTION

The present disclosure relates to computer vision systems and methods for information extraction from text images using evidence grounding techniques, as described in detail below in connection with FIGS. 1-10.

By way of background and before describing the systems and methods of the present disclosure in detail, the structure, properties, and functions of Convolutional Neural Network ("CNN") systems, Conditional Random Fields ("CRF") systems, Recurrent Neural Network ("RNN") systems, Graph Neural Network ("GNN") systems, and Graph Attention Network ("GAT") systems will be discussed first.

CRF systems are a class of statistical models applied in pattern recognition and machine learning and used to enhance the accuracy of pixel-level labeling tasks. An example of the CRF systems includes a random variable $X_i$ which is associated with a node $x_i$. Node $x_i$ represents a label assigned to a node i and can take any value from a predefined set of labels $L=\{l_1, l_2, \ldots l_L\}$. Vector X is formed by random variables $X_1, X_2, \ldots X_N$, where N is a number of nodes in graph $G=(V, E)$. A Boltzmann distribution is represented as: $P(X=x)=1/Z \exp(-E(x))$. $E(x)$ is energy of configuration $x \in L^N$, and Z is a partition function. A pairwise CRF model with energy of label assignment x is given by Equation 1, below:

$$E(x) = \sum_i \psi_u(x_i) + \sum_{i<J} \psi_p(x_i, x_j) \qquad \text{Equation 1}$$

Unary energy components $\Psi_u(x_i)$ measure the inverse likelihood of node $V_i$ taking label $x_i$ and pairwise energy components $\Psi_p(x_i, x_j)$ measure the cost of assigning labels $x_i$, $x_j$ to nodes $V_i$, $V_j$ simultaneously. In the context of image pixel labeling, the unary energy components are obtained from a feature extractor. The pairwise energies provide an image data-dependent smoothing term that encourage assigning similar labels to pixels with similar properties.

Minimizing the CRF energy E(x) yields the most probable label assignment x for a given image. Since the exact minimization is intractable, the system uses a mean-field approximation to a CRF distribution for approximate maximum posterior marginal inference. It consists of approximating the CRF distribution P(X) by a simpler distribution Q(X), which can be written as the product of independent Q marginal distributions, i.e., $Q(X)=\Pi_i Q_i(X_i)$.

Figures 1A, 1B:
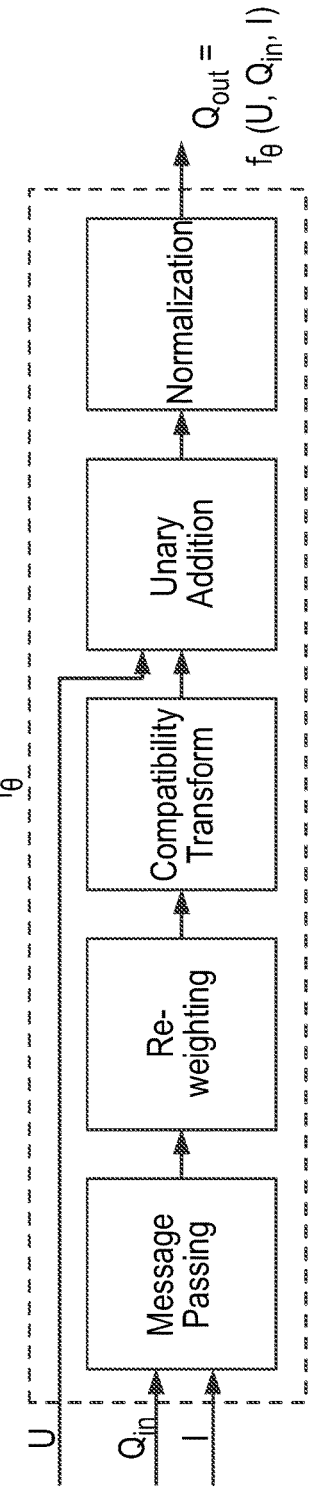
FIG. 1A depicts pseudocode illustrating operation of prior art Conditional Random Fields ("CRF") systems.
FIG. 1B is a block diagram illustrating operation of prior art CRF systems.

Although the CRF system has many advantage on modeling dependency between nodes in the graph (e.g., G=(V, E)), the CRF system cannot make use of deep features from the CNN system because the CRF system cannot easily integrate with the deep learning model to make an end-to-end system. To overcome that limitation, a prior art method called CRF as RNN (hereafter "CRF as RNN system") formulates a CRF belief propagation inference algorithm as an RNN system. FIG. 1A depicts pseudocode for implementing a CRF as an RNN system. Specifically, FIG. 1A shows a mean-field in dense CRF systems broken down to common CNN operations. FIG. 1B is an diagram illustrating processing of the CRF as an RNN system. It should be understood that the process works on input as an image with each pixel considered as a node in a fully connected graph.

$U_i(1)$ is a unary potential of label 1 assigned to pixel i, and is equal to the negative of the unary energy (i.e., $Ui(1)=-\Psi_u(Xi=1)$), where the unary energies are obtained from a fully convolutional network with the final convolution layer having L filters. To normalize the unary term with partition function Z, the CRF as an RNN system, by way of example, can use a softmax activation function. However, those skilled in the art would understand that other functions can also be used. $Qi(1)$ is a distribution over different labels of pixel i. While performing iterative steps, the CRF as an RNN system uses filters, such as M Gaussian filters on Q values, to measure the similarity between two pixels i, j for propagating belief between them. The CRF as an RNN system can use multiple filters to stabilize the output. Application of the M Gaussian filters on Q values as an example, the CRF as an RNN system derives Gaussian filter coefficients based on image features, such as the pixel locations and RGB values, which reflect how strongly a pixel is related to other pixels.

The next step of the mean-field iteration is the CRF as an RNN system taking a weighted sum of the M filter outputs for each class label 1. When each class label is considered individually, this can be viewed as usual convolution with a 1×1 filter with M input channels, and one output channel. To obtain a higher number of tunable parameters, the CRF as an RNN system uses independent kernel weights for each class label. Then, the CRF as an RNN system transforms the outputs into pairwise potentials by multiplying with transition matrix µ, where $\mu_{ij}$ is the probability of transition from label i to label j. A compatibility transform step can be viewed as another convolutional layer where the spatial receptive field is 1×1 and the number of input and output channels are both L. As stated above, the energy comprises of two term unary potential and pairwise potential, so the unary potentials are added in the next step and finally, the CRF as an RNN system normalizes the result again to make it as a distribution by applying the softmax function and entering a next iteration.

The GNN system can also process graph structured input. The main difference between the GNN system and the CRF system is that the GNN system propagates the information between nodes in forms of feature exchange instead of belief (potential) exchange. This gives the GNN system more flexibility in terms of what kind of information it can operate on between nodes. There are two different problems addressed by the GNN system-transductive learning and inductive learning. In a transductive learning setting, the input is a graph where the label is given as a training set for a set of nodes in the graph. The target can be predicting the labels of other nodes in the graph. The most successful approach for this problem is applying the spectral representation of the graphs (e.g., via, for example, a Graph Convolutional Network ("GCN") system). Learned filters depend on Laplacian eigenbasis, which depends on graph structure. Thus, a machine learning model trained on specific structure cannot be directly applied to a graph with different structure. It should be understood that this setting is ineffective for addressing the evidence grounding problem because different images will have different input graphs, whereas the objective is to predict the label for a completely new graph.

In the inductive learning setting, every training example is a small graph with all labeled nodes. In the testing phase, given a completely new graph, the system predicts the labels for all the nodes in that graph. An example method for computing node representations in an inductive manner is the GraphSAGE system. This method operates by the GraphSAGE system sampling a fixed-size neighborhood of each node to keep its computational footprint consistent, and then performing a specific aggregator over it. This method yields impressive performance across several large-scale inductive benchmarks. However, this method cannot access the entirety of the neighborhood while performing inference. To address this problem, the system can use a self-attention mechanism for building a "soft" neighborhood over an entirety of particular node's neighbor. This can be referred to as GAT system.

The following will discuss parameters and structures of the GAT system. The input to a layer is a set of node features, $h=\{h_1, h_2, \ldots, h_N\}$, $h_i \in R^F$, where N is the number of nodes, and F is the number of features in each node. The layer produces a new set of node features (of potentially different cardinality F'), $h'=\{h'_1, h'_2, \ldots, h'_N\}$, $h'i \in R^{F'}$, as its output. In order to obtain sufficient expressive power to transform the input features into higher-level features, at least one learnable linear transformation is required. To that end, as an initial step, the system applies to every node a shared linear transformation, parametrized by a weight matrix, $W \in RF$ 0×RF 0. The system then performs self-attention on the nodes. A shared attentional mechanism "a" (RF 0×RF 0→R) computes attention coefficients $e_{ij}=a(Wh_i, Wh_j)$ that indicate the importance of node j' s features to node i. In its most general formulation, this model allows every node to attend on every other node, dropping all structural information. The system injects the graph structure into the mechanism by performing masked attention, where the system computes $e_{ij}$ for nodes $j \in N_i$, where $N_i$ is some neighborhood of node i in the graph. These will be the first-order neighbors of i (including i). To make coefficients easily comparable across different nodes, the system normalizes them across all choices of j by applying the softmax function, as shown below in Equation 2:

$$\alpha_{ij} = \text{softmax}_j(e_{ij}) = \frac{\exp(e_{ij})}{\sum_{k \in N_i} \exp(e_{ik})} \quad \text{Equation 2}$$

The system uses the normalized attention coefficients to compute a linear combination of the features corresponding to them, to serve as the final output features for every node (after potentially applying a nonlinearity, a), as shown below in Equation 3:

$$h'_i = \sigma\left(\sum_{j \in N_i} \alpha_{ij} W h_j\right) \quad \text{Equation 3}$$

To stabilize the learning process of self-attention, the system employs multi-head attention. Specifically, K independent attention mechanisms execute the transformation of Equation 3, and then their features are concatenated, resulting in the following output feature representation shown in Equation 4:

$$h'_i = \|_{k=1}^{K} \sigma\left(\sum_{j \in N_i} \alpha_{ij}^k W^k h_j\right) \quad \text{Equation 4}$$

In Equation 4, k represents concatenation, $\alpha_{ij}^k$ represents normalized attention coefficients computed by the k-th attention mechanism ($a^k$), and W k represents the corresponding input linear transformation's weight matrix. The final returned output, h', consists of K features (rather than F') for each node. Specially, when the system preforms the multi-head attention on the final (prediction) layer of the network, concatenation is no longer sensible. Instead, the system employs averaging, and delays applying the final nonlinearity (e.g., a softmax or logistic sigmoid for classification problems) until then. This is illustrated in Equation 5 below:

$$h'_i = \sigma\left(\frac{1}{K}\sum_{k=1}^{K}\sum_{j \in N_i} \alpha_{ij}^k W^k h_j\right) \quad \text{Equation 5}$$

Figure 2:
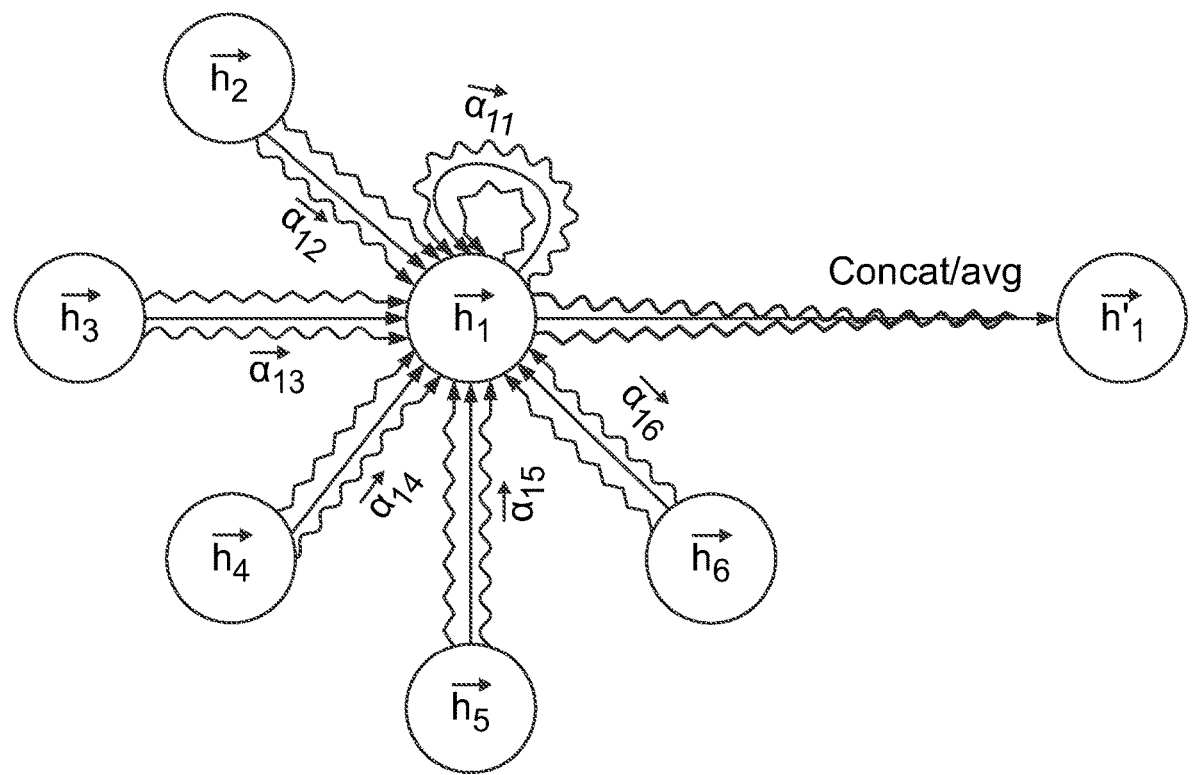
FIG. 2 is a state diagram illustrating a prior art aggregation process of a multi-head graph attentional layer of a Graph Attention Network ("GAT") system.

FIG. 2 is an illustration showing a prior art aggregation process of a multi-head graph attentional layer. Specifically, FIG. 2 shows the multi-head attention (with K=3 heads) by node 1 on its neighborhood. Different arrow styles (straight, wave, zig/zag) denote independent attention computations. The aggregated features from each head are concatenated or averaged to obtain $h_1$.

The systems and methods of the present disclosure will now be discussed. The systems and methods of the present disclosure relate to a feature extraction process which can be integrated to a deep learning model for having an end-to-end system in lieu of a fixed feature extractor, as used in a traditional CRF system. The feature extraction process of the present disclosure requires modifications and improvements to the CRF as RNN and GAT systems discussed above. These modifications overcome the deficiencies of the previous systems, which were unable to address the technological problem of providing evidence grounding in a machine learning system.

By way of example, the system, methods, and embodiments of the present disclosure will be discussed with reference to images of federal income tax (W2) forms. This is because W2 forms contain fixed content, but their format can be varied from one W2 form to another. The information that can be retrieved includes, but is not limited to retrieve, information related to predefined tags such as a social security number, an employer identification number, enrollment identification, etc. Those skilled in the art would understand that the systems and methods discussed in the present disclosure can be used with other types images and formats.

Figure 3:
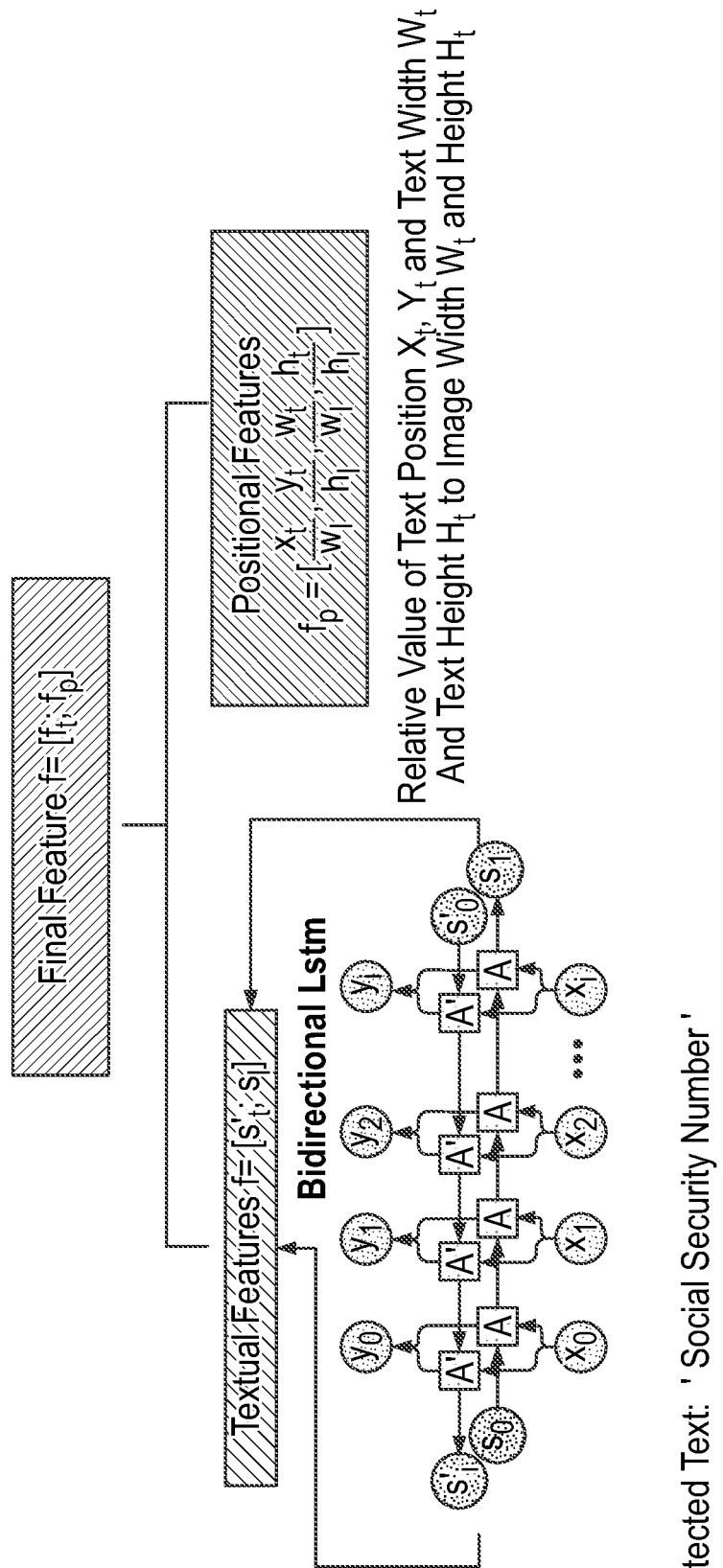
FIG. 3 is an illustration showing a feature extraction process in accordance with the present disclosure, which concatenates two features (textual features and positional features) from detected boxes and recognized text.

FIG. 3 is an illustration showing a feature extraction process of the present disclosure, which concatenates two features (textual features and positional features) from detected boxes and recognized texts. The aim of the feature extraction process is that, given detected boxes and recognized texts, the system transforms them to a fixed vector representation. It should be noted that recognized texts vary in length. As such, the system can use a bidirectional long short-term memory ("LSTM") for extracting textual features from them (by taking the last step's hidden state from both directions) with the input is the sequence of characters. Further, the system extracts positional features by receiving the relative bounding boxes positions $X_t$, $Y_t$ as well as the width $w_t$ and height $h_t$ to the image size $w_I$, $h_I$. Furthermore, the system forms a graph with adjacency list by applying k-nearest neighbors algorithm ("k-NN") based on the Euclidean distance between center positions of the bounding boxes.

In order to perform the feature extraction process, the system implements a modified CRF as RNN system and a modified GAT system. Further, evidence grounding is cast as a graph node labeling problem. As previously discussed, the CRF as RNN system is used for image segmentation and applies Gaussian filters in the entire image to get a similarity between pixels. However, in the case of, for example, W2 forms, the input is a graph without any spatial properties. As such, the system of the present disclosure uses a simplified version of a self-attention mechanism for measuring the similarity between two adjacent nodes in the graph. It should first be noted that the system can apply the attention mechanism "a" to compute the attention coefficients $e_{ij}$. However, the system would be required to transform in the space of $[Wh_i][Wh_j]$, which is a relatively high dimensional feature that can consume a lot of memory as well as computational operations. Rather, the system computes the kernel by applying the attention map α in Equation 2, discussed above, with a dot product operation instead, thereby simplifying computational complexity and reducing memory requirements. Furthermore, the system replaces a 1×1 convolutional operation by simply linear operation. Other operations are not changed. Equation 6 shows the modified CRF as RNN system, where $\cdot^T$ represents transposition and $\|$ represents the concatenation operation:

$$k(f_i, f_j) = \alpha_{ij} = \frac{\exp(W f_i^T W f_j)}{\sum_{k \in N_i} \exp(W f_i^T W f_k)} \quad \text{Equation 6}$$

Figure 4:
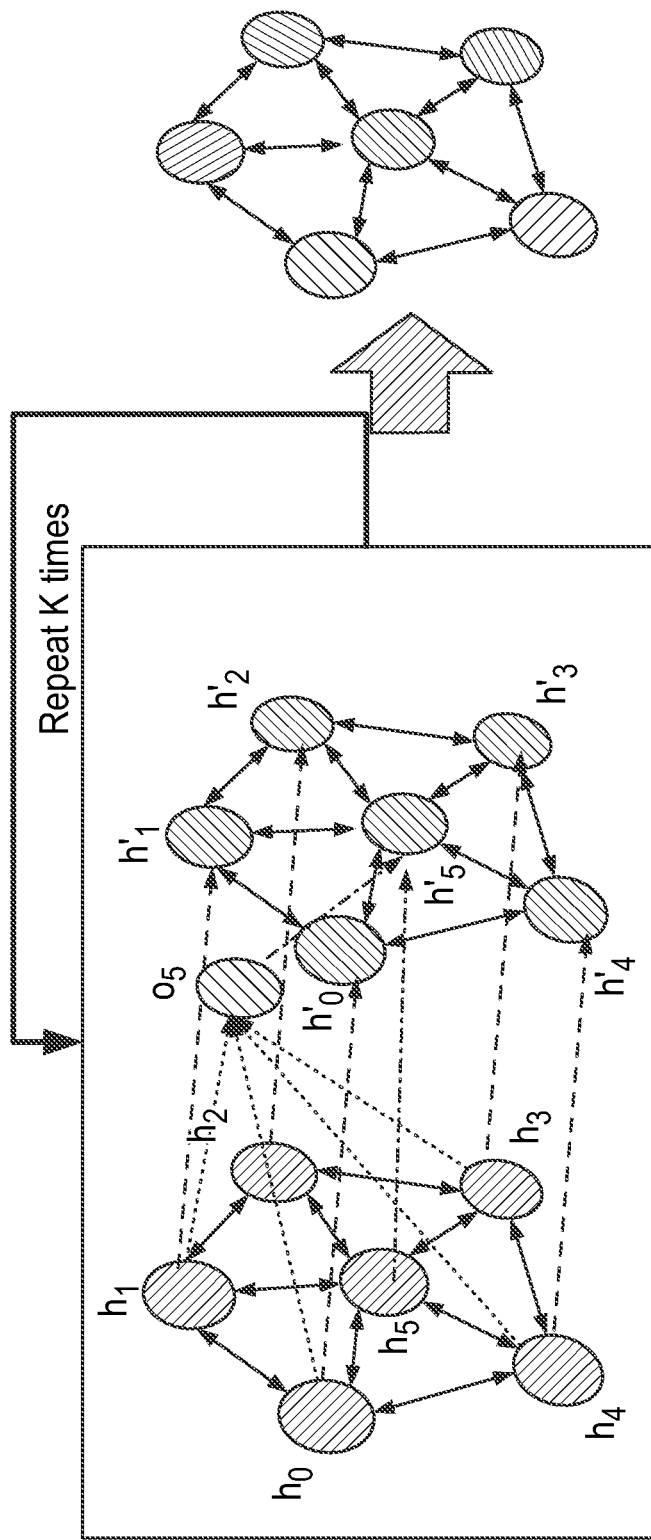
FIG. 4 is a diagram illustrating processing performed by the modified GAT system of the present disclosure.

FIG. 4 is an illustration showing the process of the modified GAT system. Specifically, instead of applying the same W for computing the similarity coefficient and transforming to a new set of node features h' from h, the system applies $W_f$, $W_g$, $W_h$ for that purpose since the modified GAT system has more learnable parameters with different purpose. The system computes the attention map a by applying Equation 7:

$$\alpha_{ij} = \frac{\exp(W_f h_i^T W_g h_j)}{\sum_{k \in N_i} \exp(W_f h_i^T W_g h_k)} \quad \text{Equation 7}$$

The modified GAT system further includes allowing h'i of node i in, as discussed above in regard to Equation 3, to just depend on its neighbors, not including itself. To achieve this, the system uses a residual mechanism, such as, for example, a ResNet system. In particular, the following equation is used by the system, where y is a learnable coefficient (initialized as zero) between residual branch and identity branch.

$$h_i' = \sigma\left(\gamma \sum_{j \in N_i} \alpha_{ij} W_h h_j + h_i\right) \quad \text{Equation 8}$$

This allows the modified GAT system to first rely on the cues on itself, and then gradually learn to assign more weight to the evidence from the neighbors. Finally, instead of applying the two graph attentional layers, the system uses multiple graph attention layers which share the same weights in recurrent manner.

Figure 5:
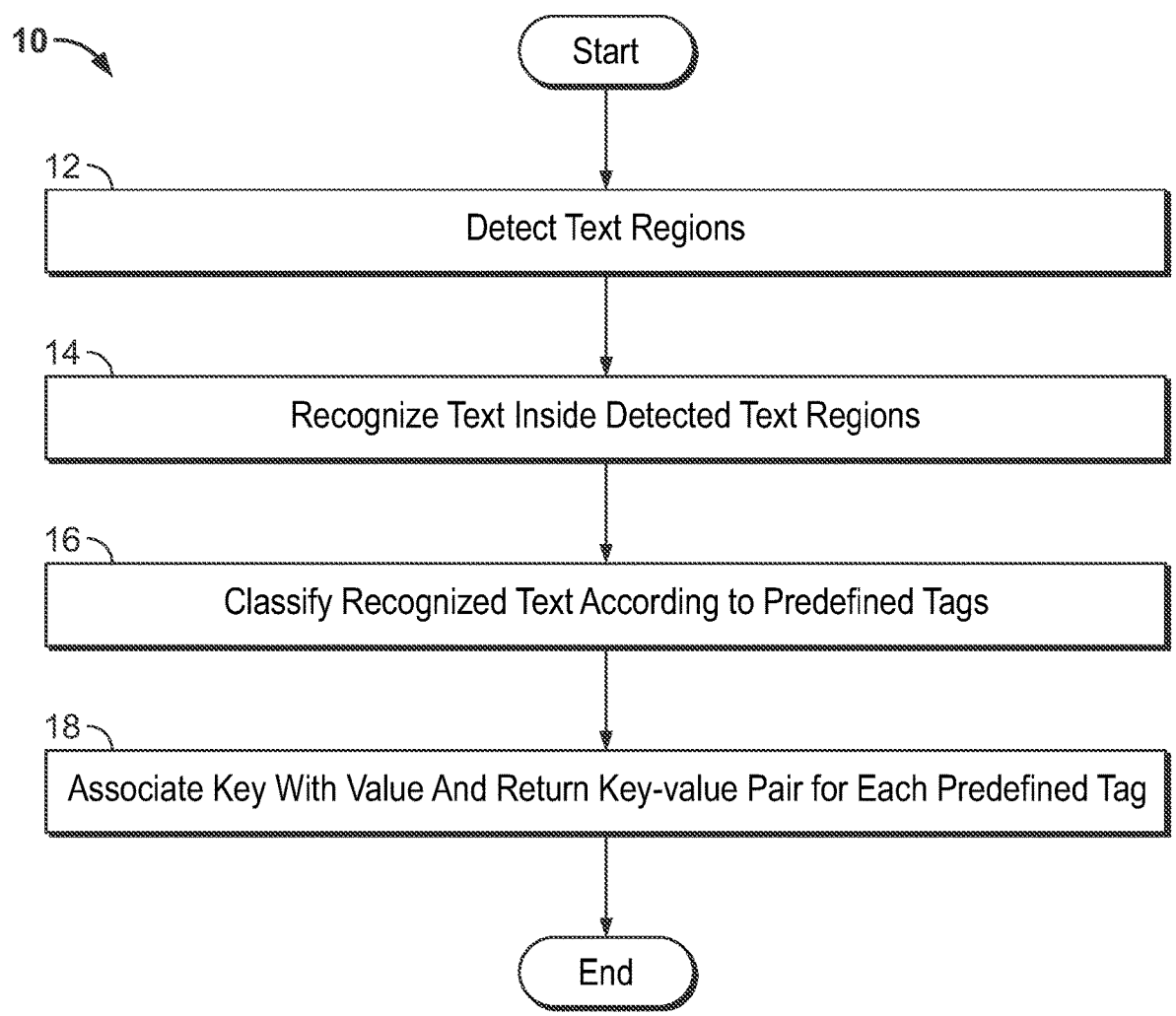
FIG. 5 is a flowchart illustrating overall process steps carried out by the computer vision system of the present disclosure.

FIG. 5 is a flowchart illustrating the overall process steps carried out by the system of the present disclosure, indicated generally at method 10. As noted above, the system uses a modified CRF as RNN system and a GAT system, which greatly improves the functionality of computer vision systems and reduces computational complexity, to perform an evidence grounding process.

In step 12, the system detects text regions in an image containing solid information. For example, the system detects the text regions by applying an Efficient and Accurate Scene Text Detector ("EAST model") to the image. The system can generate bounding boxes on the detected text regions. Those skilled in the art would understand that other models and detectors can be sued to detect text regions.

In step 14, the system recognizes text inside the detected text regions (or bounding boxes). In an example, the system recognizes text inside the detected text regions by applying a convolutional recurrent neural network ("CRNN") system. However, those skilled in the art would understand that other systems and detectors can be used to detect the text regions.

In step 16, the system classifies the recognized text according to one or more predefined tags. For example, given position features (e.g., coordinates (x, y), and width and height of the detected bounding boxes) and text features (from recognized texts), the system classifies these texts according to predefined tags. As discussed above, the system casts evidence grounding as a graph node labeling problem and uses the modified CRF as RNN system and the modified GAT system to classify the recognized text. Finally, in step 18, the system associates key with value and returns the key-value pair of each predefined tag.

Figure 6:
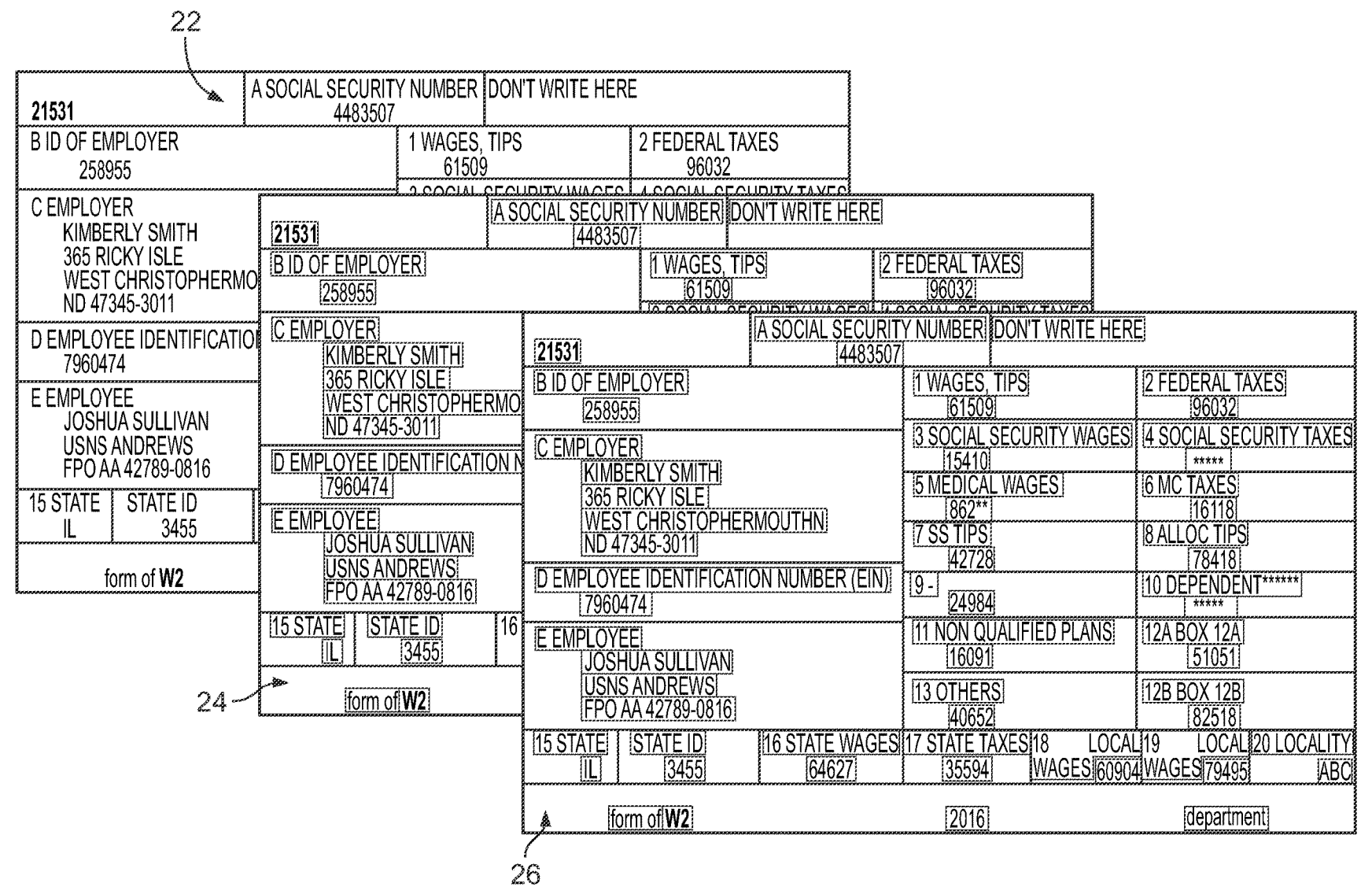

FIG. 6 is an illustration showing an example of the evidence grounding process carried out by the system. Specifically, given a text image 22, the system detects all possible complete text regions 24, and recognizes the text inside these regions as well as classifies the tag for the text regions 26.

Testing of the above systems and method will now be explained in greater detail. The models and implementation details are as follows. The text detector includes a retrained EAST model with a W2 form dataset. The dataset is pre-trained from a dataset proposed at the 13$^{th}$ International Conference on Document Analysis and Recognition ("ICDAR") in 2015. The text recognizer includes a retrained CRNN system with the W2 form dataset pretrained from a dataset proposed at the 12$^{th}$ ICDAR in 2013. A Traditional CRF baseline is used with a Graph CRF function, which uses a loopy belief propagation algorithm for the inference part and uses gradient descent for the learning part. The modified CRF as RNN system and the modified GAT systems include those described in the present disclosure. The hyper-parameters are as follows. In the modified CRF as RNN system, the number of epochs is 30, learning rate is 1e−3, the batch size is 1, the hidden size is 128, the number of Gaussian filters is 8, and the number of RNN iterations is 5 per training iteration. In the modified GAT system, the number of epochs is 20, learning rate is 1e−2, the batch size is 1, the hidden size is 128, the number of attention heads is 4 and the number of RNN iterations is 5 per training iteration. Further, the system used rectified linear units ("ReLU") as the activation a in Equation 8.

Furthermore, to show the effectiveness of graph-based method over individual nodes prediction method (just unary potential), the system also uses a model with several fully connected layers. In particular, five fully connected layers with ReLU activation between layers as well as dropout with probability 0.5 to prevent over-fitting. In addition, hyper-parameter hidden size is set to 128, and learning rate is set to 1e−2. The system also uses a "Adam" optimizer, and a "Reduce Learning Rate on Plateau" scheduler with a patience of 10.

The system uses a W2 Form Synthesized dataset (internal dataset) with a total of 919 text images, divided into a training set of 734 (80%) examples and a testing set of 185 (20%) examples. The number of tags is 55, and include EB-KEY, S1-KEY, S1-VALUE, etc. To validate the effectiveness of these parameters and setting, multiple different experiments were conducted from an easiest task to a hardest task, with four tasks total. FIG. 7 is a table showing the four tasks, along with descriptions, inputs, outputs, and metrics of the four tasks.

The quantitative results are as follows. In task 1 (tag labeling), the system conducted the text classification. Different graph inputs depend on k nearest neighbors, where k={1, 3, 5, 7}. FIG. 8A is a table showing the accuracy results produced by the system during task 1. As shown in FIG. 8A, a multilayer perceptron ("MLP") system has the lowest performance (i.e., a 25.03% accuracy) since it does not make use graph information for predicting label nodes. Among the machine learning systems that make use of graph information, the traditional CRF system performs worst since it just used the fixed feature extracted from fixed feature extractor. The GAT system of the present disclosure has a better result since it has a more flexible message passing mechanism in the feature space compared to message passing in potential space as in the CRF system. In particular GAT achieves 96.21% accuracy with k=5. Therefore, the GAT system with k=5 is used for latter experiments.

In task 2 (text recognition and tag labeling), the system tested the performance of the tag labeling system (e.g., GAT, k=5) and text recognizer (the CRNN system) with the ground-truth bounding boxes. The output of text recognizer is the input of tag labeling system. One recognition is correct if two conditions are met: a same tag and a Minimum Edit Distance ("MED") less than or equal to 2. The result was an accuracy of 78.3%. This result is significantly smaller than tag labeling alone and shows the importance of text recognizer in the end-to-end system. Using ground-truth boxes as the input and the text recognized as the output, the system produced an accuracy of 95.87% with condition is MED<2.

In task 3 (text detection, text recognition and tag labeling), the system used precision, recall, and f1-scores as metrics. The system took the result of text detection as input of text recognizer and both output of text detection and text recognizer as input to tag labeling. FIG. 8B is a table showing the results of the metrics and bounding box settings. A result in a full setting is considered correct if three conditions are met: Intersection over Union ("IoU")≥0.5, correct tag<2, and MED<2. As seen in FIG. 8B, the recall is relative lower than the precision, and the ground-truths in training set does not cover all the fields in the W2 form. Due to the accumulative error of the multiple steps from text detection to text recognition to tags labeling, the final result is relatively low, i.e. a 28.61 accuracy in the F1-score.

In task 4 (information retrieval), the system took the output of task 3 and counted the number of correct information extracted of given tags, where the condition is the MED <20% of total ground-truth text length. The accuracy attained is 35.56%. The low accuracy can be attributed to an error propagation in the whole process.

FIG. 9 is an illustration showing an example output generated by task 3. It should be noted some fields at the end of W2 form document contain mistakes with the tag labels. For example, field 20th, with value "ABC" should have label L20 instead of L19. This error occurred because the input to the GAT system is adjacency list without an order of closeness.

Figure 10:
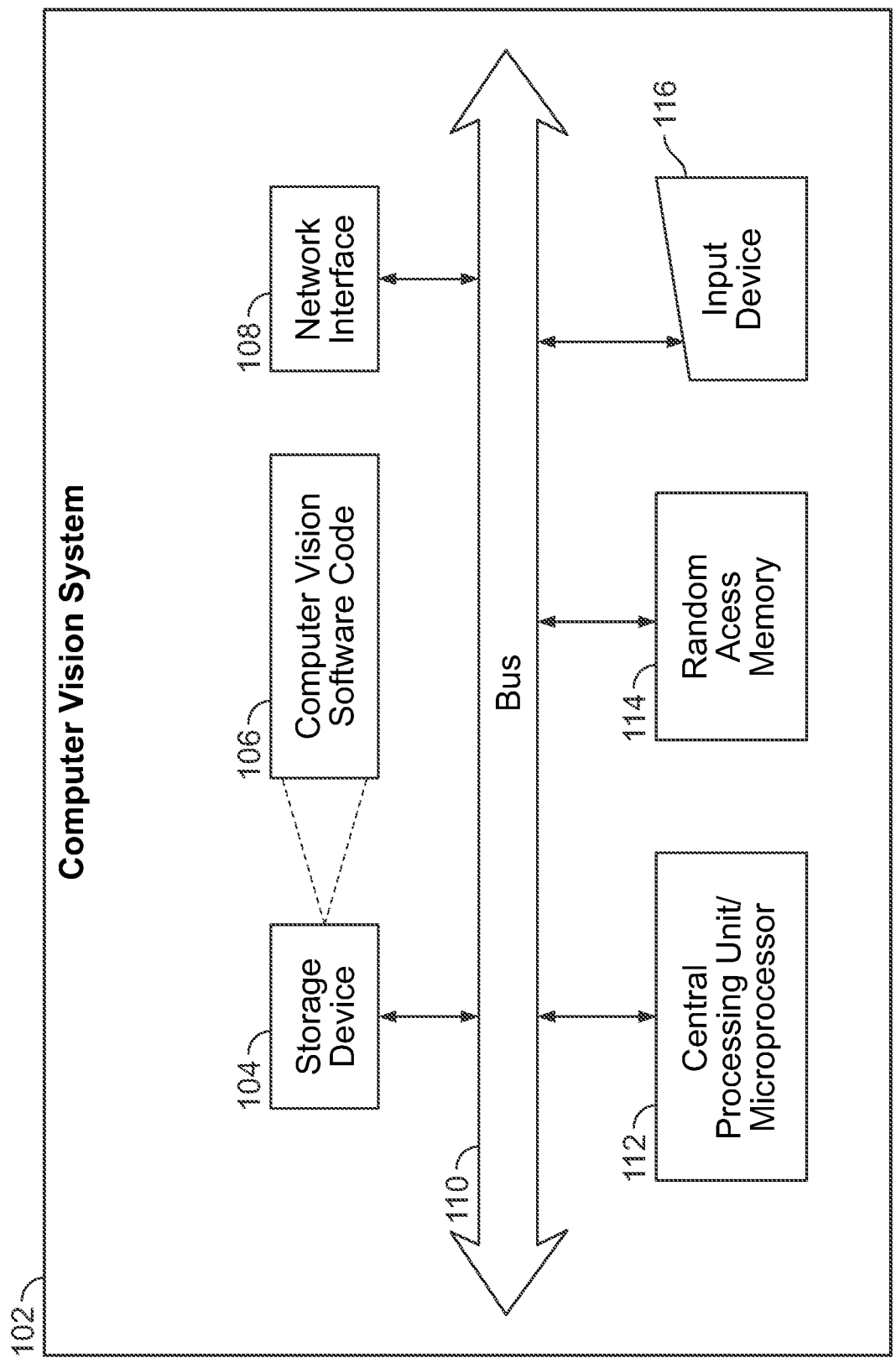
FIG. 10 is a diagram illustrating sample hardware and software components capable of being used to implement the system of the present disclosure.

FIG. 10 is a diagram showing a hardware and software components of a computer system 102 on which the system of the present disclosure can be implemented. The computer system 102 can include a storage device 104, computer vision software code 106, a network interface 108, a communications bus 110, a central processing unit (CPU) (microprocessor) 112, a random access memory (RAM) 114, and one or more input devices 116, such as a keyboard, mouse, etc. The server 102 could also include a display (e.g., liquid crystal display (LCD), cathode ray tube (CRT), etc.). The storage device 104 could comprise any suitable, computer-readable storage medium such as disk, non-volatile memory (e.g., read-only memory (ROM), eraseable programmable ROM (EPROM), electrically-eraseable programmable ROM (EEPROM), flash memory, field-programmable gate array (FPGA), etc.). The computer system 102 could be a networked computer system, a personal computer, a server, a smart phone, tablet computer etc. It is noted that the server 102 need not be a networked server, and indeed, could be a stand-alone computer system.

The functionality provided by the present disclosure could be provided by computer vision software code 106, which could be embodied as computer-readable program code stored on the storage device 104 and executed by the CPU 112 using any suitable, high or low level computing language, such as Python, Java, C, C++, C#, .NET, MATLAB, etc. The network interface 108 could include an Ethernet network interface device, a wireless network interface device, or any other suitable device which permits the server 102 to communicate via the network. The CPU 112 could include any suitable single-core or multiple-core microprocessor of any suitable architecture that is capable of implementing and running the computer vision software code 106 (e.g., Intel processor). The random access memory 114 could include any suitable, high-speed, random access memory typical of most modern computers, such as dynamic RAM (DRAM), etc.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

What is claimed is:

1. A computer vision system for text classification comprising:
   a memory; and
   a processor in communication with the memory, the processor:
   detecting a plurality of text regions in an image,
   generating a bounding box for each detected text region,
   recognizing text present within each bounding box using a neural network having a kernel computed using an attention map and a dot product operation,
   classifying the recognized text based on at least one extracted feature of each bounding box and the recognized text present within each bounding box according to a plurality of predefined tags, and
   associating a key with a value and returning a key-value pair for each predefined tag.

2. The system of claim 1, wherein the processor detects the plurality of text regions in the image by applying an Efficient and Accurate Scene Text Detector (EAST) model to the image.

3. The system of claim 1, wherein the neural network is a convolutional recurrent neural network.

4. The system of claim 1, wherein the processor classifies the recognized text by utilizing a modified conditional random fields machine learning system implemented as a recurrent neural network and a modified graph attention network.

5. The system of claim 1, wherein the processor generates a graph having an adjacency list by applying a k-nearest neighbors algorithm based on a Euclidean distance between center positions of each bounding box.

6. A method for text classification by a computer vision system, comprising the steps of:
   detecting a plurality of text regions in an image;
   generating a bounding box for each detected text region;
   recognizing text present within each bounding box using a neural network having a kernel computed using an attention map and a dot product operation;
   classifying the recognized text, based on at least one extracted feature of each bounding box and the recognized text present within each bounding box, according to a plurality of predefined tags; and
   associating a key with a value and returning a key-value pair for each predefined tag.

7. The method of claim 6, further comprising the step of detecting the plurality of text regions in the image by applying an Efficient and Accurate Scene Text Detector (EAST) model to the image.

8. The method of claim 6, wherein the neural network is a convolutional recurrent neural network.

9. The method of claim 6, further comprising the step of classifying the recognized text by utilizing a modified conditional random fields machine learning system implemented as a recurrent neural network and a modified graph attention network.

10. The method of claim 6, further comprising the step of generating a graph having an adjacency list by applying a k-nearest neighbors algorithm based on a Euclidean distance between center positions of each bounding box.

11. A non-transitory computer readable medium having instructions stored thereon for text classification by a computer vision system which, when executed by a processor, causes the processor to carry out the steps of:
  detecting a plurality of text regions in an image;
  generating a bounding box for each detected text region;
  recognizing text present within each bounding box using a neural network having a kernel computed using an attention map and a dot product operation;
  classifying the recognized text, based on at least one extracted feature of each bounding box and the recognized text present within each bounding box, according to a plurality of predefined tags; and
  associating a key with a value and returning a key-value pair for each predefined tag.

12. The non-transitory computer readable medium of claim 11, the processor further carrying out the step of detecting the plurality of text regions in the image by applying an Efficient and Accurate Scene Text Detector (EAST) model to the image.

13. The non-transitory computer readable medium of claim 11, wherein the neural network is a convolutional recurrent neural network.

14. The non-transitory computer readable medium of claim 11, the processor further carrying out the step of classifying the recognized text by utilizing a modified conditional random fields machine learning system implemented as a recurrent neural network and a modified graph attention network.

* * * * *